US 12,252,798 B2

(12) United States Patent
Misu et al.

(10) Patent No.: US 12,252,798 B2
(45) Date of Patent: Mar. 18, 2025

(54) METHOD FOR CONTROLLING ORGANIC HYDRIDE GENERATION SYSTEM, AND ORGANIC HYDRIDE GENERATION SYSTEM

(71) Applicant: ENEOS Corporation, Tokyo (JP)

(72) Inventors: Yoshitatsu Misu, Tokyo (JP); Hirofumi Takami, Tokyo (JP); Koji Matsuoka, Tokyo (JP)

(73) Assignee: ENEOS Corporation, Tokyo (JP)

( * ) Notice: Subject to any disclaimer, the term of this patent is extended or adjusted under 35 U.S.C. 154(b) by 599 days.

(21) Appl. No.: 17/637,505

(22) PCT Filed: Sep. 18, 2020

(86) PCT No.: PCT/JP2020/035488
§ 371 (c)(1),
(2) Date: Feb. 23, 2022

(87) PCT Pub. No.: WO2021/054445
PCT Pub. Date: Mar. 25, 2021

(65) Prior Publication Data
US 2022/0290314 A1 Sep. 15, 2022

(30) Foreign Application Priority Data
Sep. 20, 2019 (JP) .................. 2019-171594

(51) Int. Cl.
C25B 3/03 (2021.01)
C25B 9/19 (2021.01)
C25B 15/02 (2021.01)

(52) U.S. Cl.
CPC .............. C25B 3/03 (2021.01); C25B 9/19 (2021.01); C25B 15/02 (2013.01)

(58) Field of Classification Search
CPC .. C25B 3/03; C25B 9/19; C25B 15/02; C25B 1/04; C25B 9/23; C25B 3/25; C25B 3/00; C25B 3/05; C25B 3/09
See application file for complete search history.

(56) References Cited

FOREIGN PATENT DOCUMENTS

| JP | 2014091838 A | 5/2014 |
|---|---|---|
| JP | 2017179601 A | 10/2017 |
| JP | 2017206731 A | 11/2017 |
| JP | 2019019379 A | 2/2019 |
| JP | 2019099905 A | 6/2019 |
| JP | 2019151876 A | 9/2019 |
| WO | 2012043085 A1 | 4/2012 |
| WO | 2012091128 A1 | 7/2012 |

OTHER PUBLICATIONS

International Search Report (PCT/ISA/210), with translation, and Written Opinion (PCT/ISA/237) mailed on Nov. 24, 2020, by the Japan Patent Office as the International Searching Authority for International Application No. PCT/JP2020/035488. (10 pages).

Primary Examiner — Jacob M Amick
Assistant Examiner — Charles J Brauch
(74) Attorney, Agent, or Firm — BUCHANAN, INGERSOLL & ROONEY PC

(57) ABSTRACT

The method for controlling an organic hydride generation system includes controlling potentials in an anode electrode and a cathode electrode such that a potential change in an electrode having a higher deterioration rate among the anode electrode and the cathode electrode included in an electrolytic bath is smaller than a potential change in an electrode having a lower deterioration rate.

9 Claims, 3 Drawing Sheets

METHOD FOR CONTROLLING ORGANIC HYDRIDE GENERATION SYSTEM, AND ORGANIC HYDRIDE GENERATION SYSTEM

CROSS-REFERENCE TO RELATED APPLICATIONS

This application is based upon and claims the benefit of priority from the prior Japanese Patent Application No. 2019-171594, filed on Sep. 20, 2019, and International Patent Application No. PCT/JP2020/035488, filed on Sep. 18, 2020, the entire content of each of which is incorporated herein by reference.

BACKGROUND

Field of the Invention

The present invention relates to a method for controlling an organic hydride generation system and an organic hydride generation system.

Description of the Related Art

Conventionally, an organic hydride generation device including an anode for generating protons from water and a cathode for hydrogenating an organic compound having an unsaturated bond is known (see, for example, Patent Literature 1). In this organic hydride generation device, current flows between the anode and the cathode while water is supplied to the anode, and a hydrogenation target substance is supplied to the cathode, so that hydrogen is added to the hydrogenation target substance to obtain an organic hydride.

Patent Literature 1: WO 2012/091128 A

In recent years, renewable energy obtained by wind power, sunlight, or the like has attracted attention as energy capable of suppressing carbon dioxide emission in a generation process as compared with energy obtained by thermal power generation. In response to this, development of a system using renewable energy as a power source of the above-described organic hydride generation device is in progress. However, in a power generator using wind power or sunlight, the output fluctuates frequently, and the output becomes zero at the time of no wind or depending on weather. Therefore, when the power generator using wind power or sunlight is used as a power source of the organic hydride generation device, the device is frequently stopped and started repeatedly.

On the other hand, in the organic hydride generation device, when the power supply is stopped, a reverse current is generated in an electrochemical cell, and thus, an electrode may be deteriorated. In addition, the electrode may be deteriorated during stoppage of power supply due to gas crossover (cross leakage) between both electrodes. Therefore, it is necessary to suppress deterioration of the electrode due to the stop of the organic hydride generation device that irregularly occurs.

The organic hydride generation device as described above is generally continuously operated using stable power such as energy obtained by thermal power generation. For this reason, the organic hydride generation device is mainly stopped by an intentional stop of the power source, and it is relatively easy to take measures against deterioration of the electrode due to the stop. On the other hand, problems in a system for generating an organic hydride by a combination of renewable energy and an organic hydride generation device have not been sufficiently studied. As a result of intensive studies to realize realistic generation of an organic hydride by combining renewable energy and an organic hydride generation device, the present inventors have arrived at a technique for suppressing deterioration of an electrode due to a large number of times of power supply stoppages by the renewable energy and further improving durability of an organic hydride generation system.

SUMMARY OF THE INVENTION

The present invention has been made in view of such a situation, and an object of the present invention is to provide a technique for improving durability of an organic hydride generation system.

One aspect of the present invention is a method for controlling an organic hydride generation system including an electrolytic bath for generating an organic hydride and a power source for supplying an electrolytic current to the electrolytic bath. The electrolytic bath includes an anode electrode for oxidizing water to generate protons, a cathode electrode for hydrogenating a hydrogenation target substance with the protons to generate an organic hydride, an anode chamber accommodating the anode electrode, a cathode chamber accommodating the cathode electrode, and a diaphragm partitioning the anode chamber and the cathode chamber. The anode electrode has a deterioration characteristic of being deteriorated at a predetermined deterioration rate $d_{AN}$ by a potential change generated during an operation stop in which the electrolytic current is not supplied to the electrolytic bath, and the cathode electrode has a deterioration characteristic of being deteriorated at a predetermined deterioration rate $d_{CA}$ by a potential change generated during the operation stop. A control method according to one aspect of the present invention includes controlling potentials in an anode electrode and a cathode electrode such that a potential change in an electrode having a higher deterioration rate among the anode electrode and the cathode electrode is smaller than a potential change in an electrode having a lower deterioration rate.

Another aspect of the present invention is an organic hydride generation system. This organic hydride generation system includes: an electrolytic bath including an anode electrode for oxidizing water to generate protons, a cathode electrode for hydrogenating a hydrogenation target substance with protons to generate an organic hydride, an anode chamber accommodating the anode electrode, a cathode chamber accommodating the cathode electrode, and a diaphragm partitioning the anode chamber and the cathode chamber; a power source structured to supply an electrolytic current to the electrolytic bath; and a controller structured to control potentials in the anode electrode and the cathode electrode. The anode electrode has a deterioration characteristic of being deteriorated at a predetermined deterioration rate $d_{AN}$ by a potential change generated during an operation stop in which the electrolytic current is not supplied to the electrolytic bath, and the cathode electrode has a deterioration characteristic of being deteriorated at a predetermined deterioration rate $d_{CA}$ by a potential change generated during the operation stop. The controller controls the potentials in the anode electrode and the cathode electrode such that the potential change in an electrode having a higher deterioration rate among the anode electrode and the cathode electrode is smaller than the potential change in an electrode having a lower deterioration rate.

Any combination of the above components and these obtained by converting the expressions of the present disclosure between methods, devices, systems, etc. are also effective as aspects of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
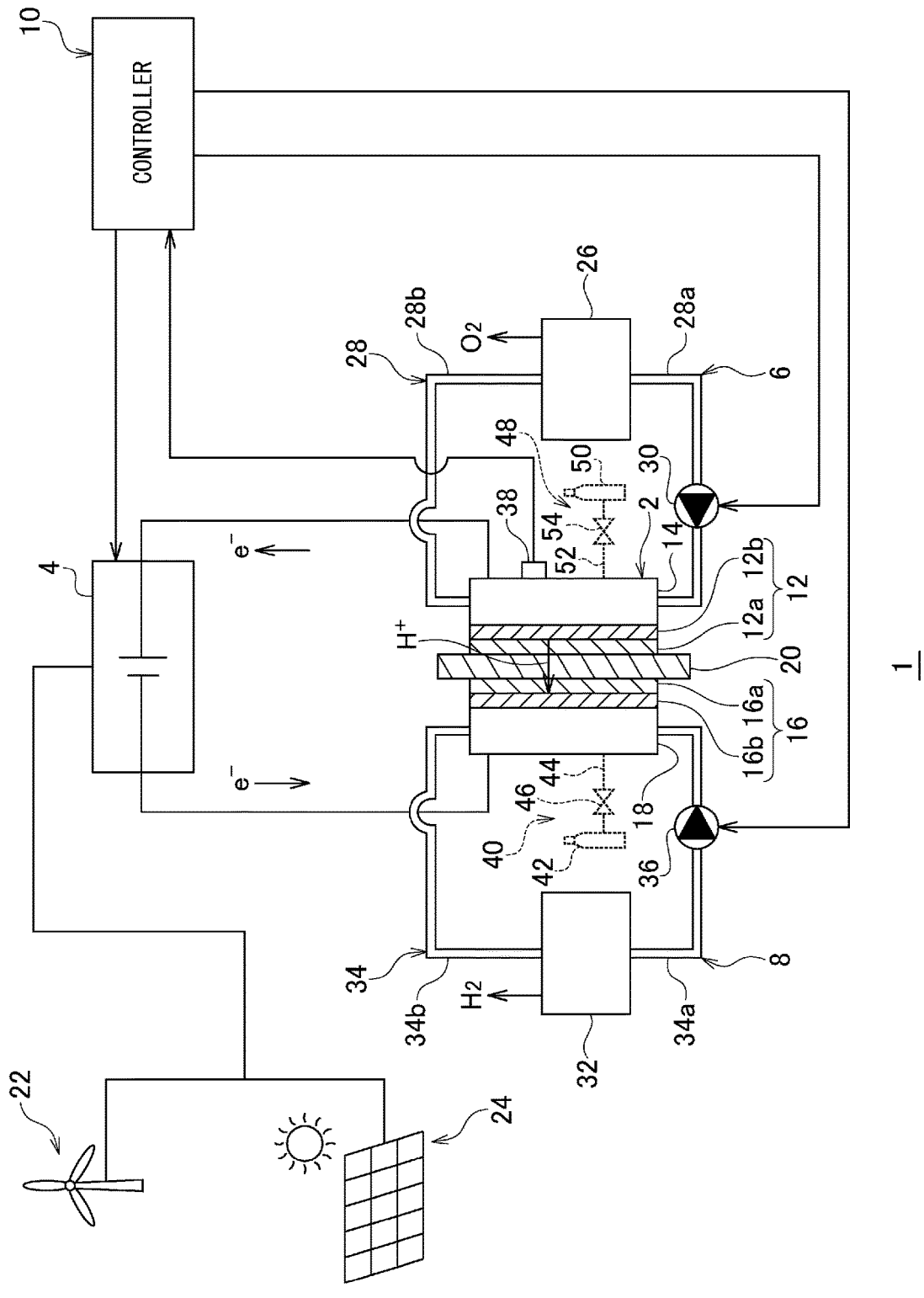
FIG. 1 is a schematic diagram of an organic hydride generation system according to an embodiment.

Hereinafter, the present invention will be described based on preferred embodiments with reference to the drawings. The embodiments are not intended to limit the invention, but are exemplary, and all features and combinations thereof described in the embodiments are not necessarily essential to the invention. The same or equivalent components, members, and processes illustrated in each drawing are denoted by the same reference numerals, and duplicated description will be appropriately omitted.

In addition, the scale and shape of each part illustrated in each figure are set for convenience in order to facilitate explanation, and are not limitedly interpreted unless otherwise specified. In addition, when terms such as "first" and "second" are used in the present specification or claims, these terms do not represent any order or importance, and are used to distinguish a certain configuration from other configurations. Further, in each drawing, some of the members that are not important for explaining the embodiment are omitted.

FIG. 1 is a schematic diagram of an organic hydride generation system according to an embodiment. An organic hydride generation system 1 includes an electrolytic bath 2, a power source 4, a first circulation mechanism 6, a second circulation mechanism 8, and a controller 10.

The electrolytic bath 2 is an electrolysis cell for generating an organic hydride by hydrogenating a hydrogenation target substance which is a dehydrogenated product of an organic hydride by an electrochemical reduction reaction. The electrolytic bath 2 includes an anode electrode 12, an anode chamber 14, a cathode electrode 16, a cathode chamber 18, and a diaphragm 20.

The anode electrode 12 is an electrode (anode) for oxidizing water to generate protons. The anode electrode 12 includes a catalyst layer 12a and a gas diffusion layer 12b. The catalyst layer 12a contains, for example, iridium (Ir) or platinum (Pt) as a catalyst. The catalyst layer 12a may contain other metals or metal compounds. The catalyst layer 12a is disposed so as to be in contact with one main surface of the diaphragm 20. The gas diffusion layer 12b is formed of a conductive porous body or the like. As a material constituting the gas diffusion layer 12b, a known material can be used. The anode electrode 12 is accommodated in the anode chamber 14. A space in the anode chamber 14 excluding the anode electrode 12 constitutes a flow path of water and oxygen generated by an electrode reaction.

The cathode electrode 16 is an electrode (cathode) for hydrogenating a hydrogenation target substance with protons to generate an organic hydride. The cathode electrode 16 includes a catalyst layer 16a and a gas diffusion layer 16b. The catalyst layer 16a contains, for example, platinum (Pt) or ruthenium (Ru) as a catalyst. The catalyst layer 16a may contain other metals or metal compounds. The catalyst layer 16a is disposed so as to be in contact with the other main surface of the diaphragm 20. The gas diffusion layer 16b is formed of a conductive porous body or the like. As a material constituting the gas diffusion layer 16b, a known material can be used. The cathode electrode 16 is accommodated in the cathode chamber 18. A space excluding the cathode electrode 16 in the cathode chamber 18 constitutes a flow path of a hydrogenation target substance and an organic hydride generated by an electrode reaction.

The anode chamber 14 and the cathode chamber 18 are partitioned by the diaphragm 20. The diaphragm 20 is disposed between the anode electrode 12 and the cathode electrode 16. The diaphragm 20 of the present embodiment is composed of a solid polymer electrolyte membrane having proton conductivity. The solid polymer electrolyte membrane is not particularly limited as long as it is a material through which protons ($H^+$) conduct, and examples thereof include a fluorine-based ion exchange membrane having a sulfonate group.

In the electrolytic bath 2, a reaction that occurs when toluene (TL) is used as an example of the hydrogenation target substance is as follows. When toluene is used as the hydrogenation target substance, the resulting organic hydride is methylcyclohexane (MCH).

Electrode reaction at anode (positive electrode):
$2H_2O \rightarrow O_2 + 4H^+ + 4e^-$ Electrode reaction at cathode (negative electrode):
$TL + 6H^+ + 6e^- \rightarrow MCH$ In the anode electrode 12, water is electrolyzed to generate oxygen gas, protons, and electrons. The protons move through the diaphragm 20 toward the cathode electrode 16. The electrons flow into the positive electrode of the power source 4. The oxygen gas is discharged to the outside through the anode chamber 14. In the cathode electrode 16, methylcyclohexane is generated by a reaction of toluene, electrons supplied from the negative electrode of the power source 4, and protons having moved through the diaphragm 20.

In the cathode electrode 16, the following side reaction occurs.

Side reaction at cathode: $2H^+ + 2e^- \rightarrow H_2$

This side reaction increases in ratio to the electrode reaction at the cathode electrode 16 as the concentration of the hydrogenation target substance supplied to the cathode electrode 16 decreases. The hydrogen gas generated by the side reaction is discharged to the outside through the cathode chamber 18.

The power source 4 is a DC power source that supplies an electrolytic current to the electrolytic bath 2. By the supply of the electrolytic current from the power source 4, a predetermined electrolytic voltage is applied between the anode electrode 12 and the cathode electrode 16 of the electrolytic bath 2. The power source 4 of the present embodiment converts input power derived from renewable energy and supplies an electrolytic current to the electrolytic bath 2. For example, a wind power generation apparatus 22 and a solar power generation apparatus 24 that generate power derived from renewable energy are connected to the power source 4. For example, when renewable energy is input in an alternating current, the power source 4 performs voltage conversion by a transformer, performs rectification by a bridge diode, performs smoothing by a smoothing electrolytic capacitor, and supplies an electrolytic current from an output terminal to the electrolytic bath 2. This makes it possible to generate an organic hydride using renewable energy. The power supplied to the power source 4 is not limited to power derived from renewable energy.

The first circulation mechanism 6 is a mechanism for circulating water in the anode chamber 14. The first circulation mechanism 6 includes a first circulation tank 26, a first circulation path 28, and a first circulation device 30. The first circulation tank 26 stores water to be supplied to the anode chamber 14. In the present embodiment, as the water to be supplied to the anode chamber 14, an anolyte having a predetermined ionic conductivity such as an aqueous sulfuric acid solution, a nitric acid aqueous solution, or a hydrochloric acid aqueous solution, or pure water is stored in the first circulation tank 26.

The first circulation tank 26 and the anode chamber 14 are connected by the first circulation path 28. The first circulation path 28 includes a forward path portion 28a for supplying water (anolyte) from the first circulation tank 26 to the anode chamber 14, and a return path portion 28b for recovering water from the anode chamber 14 to the first circulation tank 26. The first circulation device 30 is provided in the middle of the forward path portion 28a. By drive of the first circulation device 30, water flows in the first circulation path 28 and circulates between the first circulation tank 26 and the anode chamber 14. As the first circulation device 30, for example, various pumps such as a gear pump and a cylinder pump, a natural flow type device, or the like can be used.

The first circulation tank 26 also functions as a gas-liquid separator. Since oxygen is generated by the electrode reaction in the anode electrode 12, gaseous oxygen and dissolved oxygen are contained in the water recovered from the anode chamber 14. The gaseous oxygen is separated from the water in the first circulation tank 26 and taken out of the system. The water from which the oxygen is separated is supplied to the electrolytic bath 2 again.

The second circulation mechanism 8 is a mechanism for circulating the hydrogenation target substance in the cathode chamber 18. The second circulation mechanism 8 includes a second circulation tank 32, a second circulation path 34, and a second circulation device 36. The second circulation tank 32 stores the hydrogenation target substance to be supplied to the cathode electrode 16. The hydrogenation target substance is a compound that is hydrogenated by an electrochemical reduction reaction in the electrolytic bath 2 to become an organic hydride, in other words, a dehydrogenated product of an organic hydride. The hydrogenation target substance is preferably a liquid at normal temperature and normal pressure. In the second circulation tank 32, not only the hydrogenation target substance but also the organic hydride generated in the cathode electrode 16 is stored. Hereinafter, the liquid stored in the second circulation tank 32 is appropriately referred to as a catholyte.

The hydrogenation target substance and the organic hydride used in the present embodiment are not particularly limited as long as they are organic compounds capable of adding/desorbing hydrogen by reversibly causing a hydrogenation reaction/dehydrogenation reaction, and, for example, acetone-isopropanol type, benzoquinone-hydroquinone type, and aromatic hydrocarbon type can be widely used. Among them, aromatic hydrocarbon type typified by toluene-methylcyclohexane type is preferable from the viewpoint of transportability at the time of energy transport, toxicity, safety, storage stability, and the like, and from the viewpoint of the amount of hydrogen that can be transported per volume or mass, ease of hydrogenation and dehydrogenation reaction, and energy conversion efficiency such that Gibbs free energy change is not significantly large.

The aromatic hydrocarbon compound used as the hydrogenation target substance is a compound containing at least one aromatic ring, and examples thereof include benzene, alkylbenzene, naphthalene, alkylnaphthalene, anthracene, and diphenylethane. Alkylbenzene includes a compound in which 1 to 4 hydrogen atoms of an aromatic ring are substituted with a linear alkyl group or a branched alkyl group having 1 to 6 carbon atoms, and examples thereof include toluene, xylene, mesitylene, ethylbenzene, and diethylbenzene. Alkylnaphthalene includes a compound in which 1 to 4 hydrogen atoms of an aromatic ring are substituted with a linear alkyl group or a branched alkyl group having 1 to 6 carbon atoms, and examples thereof include methylnaphthalene. These may be used alone or in combination.

The hydrogenation target substance is preferably at least one of toluene and benzene. Nitrogen-containing heterocyclic aromatic compounds such as pyridine, pyrimidine, pyrazine, quinoline, isoquinoline, N-alkylpyrrole, N-alkylindole, and N-alkyldibenzopyrrole can also be used as the hydrogenation target substance. The organic hydride is obtained by hydrogenating the above-mentioned hydrogenation target substance, and examples thereof include cyclohexane, methylcyclohexane, dimethylcyclohexane, and piperidine.

The second circulation tank 32 and the cathode chamber 18 are connected by the second circulation path 34. The second circulation path 34 includes a forward path portion 34a for supplying a hydrogenation target substance from the second circulation tank 32 to the cathode chamber 18, and a return path portion 34b for recovering an organic hydride and an unreacted hydrogenation target substance from the cathode chamber 18 to the second circulation tank 32. The second circulation device 36 is provided in the middle of the forward path portion 34a. By drive of the second circulation device 36, the hydrogenation target substance flows in the second circulation path 34 and circulates between the second circulation tank 32 and the cathode chamber 18. As the second circulation device 36, for example, various pumps such as a gear pump and a cylinder pump, a natural flow type device, or the like can be used.

The second circulation tank 32 also functions as a gas-liquid separator. Since hydrogen is generated by the side reaction in the cathode electrode 16, gaseous hydrogen and dissolved hydrogen are contained in the catholyte recovered from the cathode chamber 18. The gaseous hydrogen is separated from the catholyte in the second circulation tank 32 and taken out of the system. The catholyte from which the hydrogen is separated is supplied to the electrolytic bath 2 again.

The controller 10 controls potentials in the anode electrode 12 and the cathode electrode 16. The controller 10 is realized by an element or a circuit such as a CPU or a memory of a computer as a hardware configuration, and is realized by a computer program or the like as a software configuration, but is illustrated as a functional block realized by cooperation between them in FIG. 1. It should be naturally understood by those skilled in the art that the functional block can be realized in various forms by a combination of hardware and software.

A signal indicating the potentials in the anode electrode 12 and the cathode electrode 16 or a voltage (so-called cell voltage) of the electrolytic bath 2 is input to the controller 10 from a potential detection unit 38 provided in the electrolytic bath 2. The potential in each electrode and the voltage of the electrolytic bath 2 can be detected by a known method. As an example, a reference electrode is provided on the diaphragm 20. The reference electrode is held at a reference electrode potential. For example, the reference electrode is a reversible hydrogen electrode (RHE). The potential detection unit 38 detects the potential in each electrode with respect to the reference electrode and transmits the detection result to the controller 10. The potential detection unit 38 includes, for example, a known voltmeter.

Based on the detection result of the potential detection unit 38, the controller 10 controls the output of the power source 4, the drive of the first circulation device 30 and the second circulation device 36, and the like during the operation of the organic hydride generation system 1. In addition, the controller 10 controls the power source 4, the first circulation device 30, the second circulation device 36, and the like at the time of shifting to the operation stop of the organic hydride generation system 1, during the operation stop, when starting the operation, and the like based on the electrode deterioration reduction control to be described later. The "operation" or "during the operation" of the organic hydride generation system 1 means a state in which an electrolytic current is supplied from the power source 4 to the electrolytic bath 2. In addition, the "operation stop" or "during the operation stop" means a state in which no electrolytic current is supplied from the power source 4 to the electrolytic bath 2 (supply of the electrolytic current is stopped).

Although only one electrolytic bath 2 is illustrated in FIG. 1, the organic hydride generation system 1 may include a plurality of electrolytic baths 2. In this case, the respective electrolytic baths 2 are arranged in the same direction such that the anode chambers 14 and the cathode chambers 18 are arranged in the same direction, and are stacked with an energizing plate interposed between the adjacent electrolytic baths 2. Thus, the electrolytic baths 2 are electrically connected in series. The energizing plate is made of a conductive material such as metal.

Cause of Potential Change Occurring During Operation Stop

When the supply of the electrolytic current from the power source 4 to the electrolytic bath 2 is stopped and the operation of the organic hydride generation system 1 is stopped, gas crossover may occur via the diaphragm 20. Specifically, a part of the oxygen gas generated at the anode electrode 12 passes through the diaphragm 20 and moves to the cathode electrode 16 side. In addition, a part of the hydrogen gas generated by the side reaction in the cathode electrode 16 passes through the diaphragm 20 and moves to the anode electrode 12 side.

When the gas crossover occurs, in the anode electrode 12, the remaining oxygen gas reacts with the hydrogen gas moving from the cathode electrode 16 side, and water is generated. Similarly, in the cathode electrode 16, the remaining hydrogen gas reacts with the oxygen gas moving from the anode electrode 12 side to generate water. Since the oxidation reaction of the organic hydride generated in the cathode electrode 16 hardly occurs, the organic hydride does not function as a reducing agent. Therefore, on the cathode electrode 16 side, only hydrogen gas as a by-product functions as a reducing agent.

In addition, when the operation of the organic hydride generation system 1 is stopped, a potential difference between the reduction reaction of oxygen at the anode electrode 12 and the oxidation reaction of by-product hydrogen at the cathode electrode 16 is used as an electromotive force, and a current in a direction opposite to that during electrolysis, that is, a reverse current may flow through a circulation path of the anolyte or the like as a path. The reverse reaction after the electrolysis in the electrolytic bath 2 is stopped is as follows.

Reaction at anode after electrolysis is stopped:
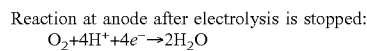
$O_2 + 4H^+ + 4e^- \rightarrow 2H_2O$ Reaction at cathode after electrolysis is stopped:
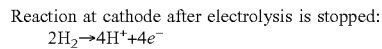
$2H_2 \rightarrow 4H^+ + 4e^-$ Even in the generation of the reverse current, only the hydrogen gas generated in the side reaction functions as a reducing agent. In addition, since the hydrogenation target substance such as toluene has no ion conductivity, only the circulation path of the anolyte serves as an ion conduction path.

When the gas crossover or the reverse current occurs, oxygen in the anode chamber 14 and hydrogen in the cathode chamber 18 are consumed in amounts corresponding to equal charge amounts. That is, two molecules of hydrogen are consumed for one molecule of oxygen by the above-described reaction. When oxygen or hydrogen remaining in any of the electrode chambers is exhausted and the electric capacity of the electrode itself is consumed, the potentials in both electrodes change to the oxidation-reduction potential in the electrode in which oxygen or hydrogen remains at that time. That is, when the operation of the organic hydride generation system 1 is stopped, the potentials in the anode electrode 12 and the cathode electrode 16 change to the potential in the electrode having a larger total amount of the total amount of the oxidizing agent on the anode side and the total amount of the reducing agent on the cathode side.

The total amount of each of the oxidizing agent on the anode side and the reducing agent on the cathode side can be calculated as follows in terms of the electricity amount (charge amount).

Total amount of oxidizing agent (electricity amount)
=electrode capacity of anode electrode+number of reactive electrons×Faraday constant×number of moles of oxygen in electrode chamber Total amount of reducing agent (electricity amount)
=electrode capacity of cathode electrode+number of reacted electrons×Faraday constant×number of moles of hydrogen in electrode chamber In the above formula, the number of moles of oxygen is the total number of moles of oxygen dissolved in water and oxygen in a gas state. Similarly, the number of moles of hydrogen is the total number of moles of hydrogen dissolved in the catholyte and hydrogen in a gas state.

In the electrolytic bath 2 of the present embodiment, the potential in the anode electrode 12 is 1.2V (vs. RHE) or more and the potential in the cathode electrode 16 is about 0.15V (vs. RHE) or less during the operation or immediately after the operation stop of the organic hydride generation system 1. When the gas crossover or the reverse current occurs while the operation of the organic hydride generation system 1 is stopped, the potential in the anode electrode 12 may decrease to the oxidation-reduction potential in the anode catalyst or less, or the potential in the cathode electrode 16 may increase to the oxidation-reduction potential in the cathode catalyst or more.

When such a change in potential occurs, a valence change, elution, aggregation, and the like of the catalyst occur, and deterioration of the electrode whose potential has changed progresses. As the deterioration of the electrode progresses, the electrolysis overvoltage of the electrolytic bath 2 increases, and the amount of power required to generate the organic hydride of the unit mass increases. When the amount of power required to generate the organic hydride increases and the generation efficiency of the organic hydride falls below a predetermined value, the electrolytic bath 2 reaches the end of its life. The life caused by the deterioration of the electrode is based on, for example, a case where the voltage (in the case of the current density of 1 A/cm$^2$) during electrolysis of the electrolytic bath 2 increases by 20%.

Countermeasures Against Electrode Deterioration Caused by Potential Change

The probability of a change in the potential in the anode electrode 12 and the probability of a change in the potential in the cathode electrode 16 are normally unknown. In addition, the resistance to reduction deterioration of the anode electrode 12 and the resistance to oxidation deterioration of the cathode electrode 16 vary depending on the type, amount, and the like of the contained catalyst. For this reason, there is generally a large difference in the number of potential changes (hereinafter, this number is appropriately referred to as the number of lifetime) required for reaching the life of the electrolytic bath 2 in each electrode.

The anode electrode 12 has a deterioration characteristic of being deteriorated at a predetermined deterioration rate $d_{AN}$ by a potential change generated during the operation stop. In addition, the cathode electrode 16 has a deterioration characteristic of being deteriorated at a predetermined deterioration rate $d_{CA}$ by a potential change generated during the operation stop. The deterioration rate $d_{AN}$ and the deterioration rate $d_{CA}$ are values (unit: V/cycle) obtained by dividing, by the number of cycles, the amount of change in voltage during rated electrolysis before and after a predetermined potential cycle test when the predetermined potential cycle test is performed on each of the anode electrode 12 and the cathode electrode 16. In the potential cycle test performed on the anode electrode 12, the potential in the anode electrode 12 during the rated electrolysis of the organic hydride generation system 1 and the potential obtained by subtracting the overvoltage from the potential in the cathode electrode 16 during the rated electrolysis are repeatedly applied to the anode electrode 12. In the potential cycle test performed on the cathode electrode 16, the potential in the cathode electrode 16 during the rated electrolysis of the organic hydride generation system 1 and the potential obtained by subtracting the overvoltage from the potential in the anode electrode 12 during the rated electrolysis are repeatedly applied to the cathode electrode 16.

For example, in the potential cycle test, the potential in the anode electrode 12 during the rated electrolysis and the potential in the electrode on the opposite side immediately after the electrolysis is stopped, that is, the potential in the cathode electrode 16 after the overvoltage disappears from the potential during the rated electrolysis are repeatedly applied to the anode electrode 12. Similarly, the potential in the cathode electrode 16 during the rated electrolysis and the potential in the electrode on the opposite side immediately after the electrolysis is stopped, that is, the potential in the anode electrode 12 after the overvoltage disappears from the potential during the rated electrolysis are repeatedly applied to the cathode electrode 16. As an example, a potential of 1.5V and a potential of 0V are repeatedly applied to the anode electrode 12. A potential of −0.2V and a potential of 1.2V are repeatedly applied to the cathode electrode 16.

When this potential cycle test is performed, deterioration of the electrode catalyst generally proceeds. As the number of cycles increases, the voltage during the rated electrolysis gradually increases. Therefore, when a value obtained by dividing an increase amount (displacement amount) of the voltage by the number of cycles is defined as a deterioration rate, the anode electrode 12 has a deterioration characteristic of being deteriorated at the deterioration rate $d_{AN}$, and the cathode electrode 16 has a deterioration characteristic of being deteriorated at the deterioration rate $d_{CA}$.

It is assumed that the electrolytic bath 2 comes to the end of its life when the voltage during the rated electrolysis increases by 0.3V. When the deterioration rate of the electrode which is hardly deteriorated is 0.00003V/time and the deterioration rate of the electrode which is easily deteriorated is 0.0003 V/time, in a case where the potential change is not controlled, the number of lifetime of the electrode which is easily deteriorated becomes a bottleneck, and the electrolytic bath 2 reaches the end of its life by 1,000 times of operation stop at the minimum, and by 2,000 times of operation stop even in a case where both the electrodes fluctuate in potential the same number of times. On the other hand, in a case where the potential change is caused only in the electrode which is hardly deteriorated, the operation stop can be allowed up to 10,000 times. Therefore, in order to prolong the life of the electrolytic bath 2, it is important to allow a potential change in the electrode which is hardly deteriorated and to suppress a potential change in the electrode which is easily deteriorated while the operation of the organic hydride generation system 1 is stopped.

Therefore, the method for controlling the organic hydride generation system 1 according to the present embodiment includes controlling the potentials in the anode electrode 12 and the cathode electrode 16 such that a potential change in an electrode having a higher deterioration rate due to a potential change generated during an operation stop in which an electrolytic current is not supplied to the electrolytic bath 2 is smaller than a potential change in an electrode having a lower deterioration rate among the anode electrode 12 and the cathode electrode 16. By comparing the deterioration rate $d_{AN}$ of the anode electrode 12 with the deterioration rate $d_{CA}$ of the cathode electrode 16 and suppressing the potential change in the electrode having a higher deterioration rate, the life of the electrolytic bath 2 can be extended.

For example, when the deterioration rate $d_{CA}$ of the cathode electrode 16 is higher than the deterioration rate $d_{AN}$ of the anode electrode 12, the potentials in both electrodes are controlled so that the potential increase amount in the cathode electrode 16 is smaller than the potential decrease amount in the anode electrode 12, whereby the life of the electrolytic bath 2 can be extended. When the difference between the deterioration rates of both electrodes is 2 times or more ($d_{AN}/d_{CA}<0.5$ or $d_{CA}/d_{AN}<0.5$), it is considered that the life of the electrolytic bath 2 can be effectively extended by suppressing the potential change in the electrode having a higher deterioration rate.

In order to suppress the potential change in the electrode having a higher deterioration rate, a state in which the sum of the charge amount of oxygen or hydrogen present in the electrode chamber of the electrode having a higher deterioration rate and the charge amount of the electrode itself is larger than the sum of the charge amount of hydrogen or oxygen present in the electrode chamber of the electrode having a lower deterioration rate and the charge amount of the electrode itself may be maintained during the operation stop of the organic hydride generation system 1.

The present inventors have found that the degree of deterioration due to an increase in the potential in the cathode electrode 16 made of platinum or ruthenium to the vicinity of the potential in the anode electrode 12 is larger than the deterioration due to a decrease in the potential in the anode electrode 12 made of platinum or iridium to the vicinity of the potential in the cathode electrode 16, that is, the number of lifetime of the cathode electrode 16 is smaller than that of the anode electrode 12. In this case, a state in which the sum of the negative charge amount of hydrogen present in the cathode chamber 18 and the charge amount of the cathode electrode 16 is larger than the sum of the positive charge amount of oxygen present in the anode chamber 14 and the charge amount of the anode electrode 12 may be maintained.

Therefore, the method for controlling the organic hydride generation system 1 according to the present embodiment includes maintaining the state of $Q_{AN}$_electrode+$Q_{AN\_O_2}$<$Q_{CA}$_electrode+$Q_{CA\_H_2}$ when the deterioration rate $d_{CA}$ of the cathode electrode 16 is higher than the deterioration rate $d_{AN}$ of the anode electrode 12 or maintaining the state of $Q_{AN}$_electrode+$Q_{AN\_O_2}$>$Q_{CA}$_electrode+$Q_{CA\_H_2}$ when the deterioration rate $d_{AN}$ of the anode electrode 12 is higher than the deterioration rate $d_{CA}$ of the cathode electrode 16, where $Q_{AN}$_electrode represents the charge amount of the anode electrode 12, $Q_{CA}$_electrode represents the charge amount of the cathode electrode 16, $Q_{AN\_O_2}$ represents the absolute value of the positive charge amount of oxygen present in the anode chamber 14, and $Q_{CA\_H_2}$ represents the absolute value of the negative charge amount of hydrogen present in the cathode chamber 18.

Specific Method 1 for Controlling Potential Change During Operation Stop

In the organic hydride generation system 1, the hydrogenation target substance is circulated in the cathode chamber 18 during operation by the second circulation mechanism 8. When the hydrogenation target substance is circulated in the cathode chamber 18, not only the organic hydride and the unreacted hydrogenation target substance in the cathode chamber 18 but also by-product hydrogen is discharged to the second circulation tank 32 side accordingly. Therefore, the second circulation mechanism 8 functions as a discharge mechanism that discharges hydrogen in the cathode chamber 18.

Therefore, the method for controlling the organic hydride generation system 1 according to the present embodiment includes, when the deterioration rate $d_{CA}$ of the cathode electrode 16 is higher than the deterioration rate $d_{AN}$ of the anode electrode 12, stopping the supply of the electrolytic current after a predetermined time has elapsed since the circulation of the hydrogenation target substance is suppressed at the time of shifting to the operation stop of the organic hydride generation system 1.

That is, the controller 10 stops the supply of the electrolytic current from the power source 4 after a predetermined time has elapsed since the drive of the second circulation mechanism 8 is suppressed. The discharge of the hydrogen gas present in the cathode chamber 18 can be suppressed by suppressing the circulation of the hydrogenation target substance to the cathode chamber 18 prior to the stop of the supply of the electrolytic current. In addition, the amount of hydrogenation target substance present in the cathode chamber 18 can be reduced, and the progress of hydrogen generation as a side reaction can be promoted. As a result, the amount of hydrogen in the cathode chamber 18 can be increased. As a result, it is possible to maintain a state in which the negative charge amount on the cathode side is larger than the positive charge amount on the anode side, and to suppress the potential fluctuation in the cathode electrode 16 which is easily deteriorated.

The "suppressing the circulation" means that the circulation amount is reduced to preferably 1/100 or less, more preferably 1/1,000 or less of the flow amount during the rated electrolysis, and further preferably 0, that is, the circulation is completely stopped. In addition, the "predetermined time" can be set in advance based on an experiment or simulation by a designer. For example, the predetermined time is a time required until the cathode chamber 18 is filled with the hydrogen gas.

Further, the control method of the present embodiment includes, when the deterioration rate $d_{AN}$ of the anode electrode 12 is higher than the deterioration rate $d_{CA}$ of the cathode electrode 16, suppressing the circulation of the hydrogenation target substance after a predetermined time has elapsed since the supply of the electrolytic current is stopped at the time of shifting to the operation stop of the organic hydride generation system 1.

That is, the controller 10 suppresses the drive of the second circulation mechanism 8 after a predetermined time has elapsed since the supply of the electrolytic current from the power source 4 is stopped. The discharge of the hydrogen gas present in the cathode chamber 18 can be promoted by continuing the circulation of the hydrogenation target substance to the cathode chamber 18 even after the supply of the electrolytic current is stopped. Therefore, the amount of hydrogen present in the cathode chamber 18 can be reduced. As a result, it is possible to maintain a state in which the positive charge amount on the anode side is larger than the negative charge amount on the cathode side, and to suppress the potential fluctuation in the anode electrode 12 which is easily deteriorated.

The "suppressing the circulation" means that the circulation amount is reduced to preferably 1/100 or less, more preferably 1/1,000 or less of the flow amount during the rated electrolysis, and further preferably 0, that is, the circulation is completely stopped. In addition, the "predetermined time" can be set in advance based on an experiment or simulation by a designer. For example, the predetermined time is a time required until the inside of the cathode chamber 18 is filled with the catholyte.

The organic hydride generation system 1 may include a mechanism other than the second circulation mechanism 8 as a discharge mechanism for discharging hydrogen in the cathode chamber 18. For example, the organic hydride generation system 1 may include, as the discharge mechanism, a gas circulation mechanism 40 that circulates an inert gas such as nitrogen or an oxidizing gas in the cathode chamber 18. When the deterioration rate $d_{AN}$ of the anode electrode 12 is higher than the deterioration rate $d_{CA}$ of the cathode electrode 16, an inert gas or the like is circulated in the cathode chamber 18 by the gas circulation mechanism 40, so that hydrogen in the cathode chamber 18 can be discharged to reduce the amount of remaining hydrogen in the cathode chamber 18. The oxidizing gas is a substance having an oxidizing action on the cathode catalyst, and is, for example, air or oxygen.

For example, the gas circulation mechanism 40 includes a tank 42 for an inert gas or an oxidizing gas, a gas circulation path 44 connecting the cathode chamber 18 and the tank 42, and an on-off valve 46 provided in the middle of the gas circulation path 44, and the on-off valve 46 is controlled by the controller 10. The controller 10 can switch between circulation and stopping of the inert gas or the like from the tank 42 to the cathode chamber 18 by controlling the on-off valve 46.

Specific Method 2 for Controlling Potential Change During Operation Stop

In the organic hydride generation system 1, water is circulated in the anode chamber 14 during operation by the first circulation mechanism 6. When water is circulated in the anode chamber 14, oxygen in the anode chamber 14 is discharged to the first circulation tank 26 side accordingly. Therefore, the first circulation mechanism 6 functions as a discharge mechanism that discharges oxygen in the anode chamber 14.

Therefore, the control method of the present embodiment includes, when the deterioration rate $d_{CA}$ of the cathode electrode 16 is higher than the deterioration rate $d_{AN}$ of the anode electrode 12, suppressing the circulation of water after a predetermined time has elapsed since the supply of the electrolytic current is stopped at the time of shifting to the operation stop of the organic hydride generation system 1.

That is, the controller 10 suppresses the drive of the first circulation mechanism 6 after a predetermined time has elapsed since the supply of the electrolytic current from the power source 4 is stopped. The amount of oxygen present in the anode chamber 14 can be reduced by continuing the circulation of water to the anode chamber 14 even after the supply of the electrolytic current is stopped. As a result, it is possible to maintain a state in which the negative charge amount on the cathode side is sufficiently larger than the positive charge amount on the anode side, and to suppress the potential fluctuation in the cathode electrode 16 which is easily deteriorated.

The "suppressing the circulation" means that the circulation amount is reduced to preferably 1/100 or less, more preferably 1/1,000 or less of the flow amount during the rated electrolysis, and further preferably 0, that is, the circulation is completely stopped. In addition, the "predetermined time" can be set in advance based on an experiment or simulation by a designer. For example, the predetermined time is a time required until all the oxygen gas in the anode chamber 14 is expelled to the first circulation tank 26 side and the anode chamber 14 is filled with water.

Further, the control method of the present embodiment includes, when the deterioration rate $d_{AN}$ of the anode electrode 12 is higher than the deterioration rate $d_{CA}$ of the cathode electrode 16, stopping the supply of the electrolytic current after a predetermined time has elapsed since the circulation of water to the anode chamber 14 is suppressed at the time of shifting to the operation stop of the organic hydride generation system 1.

That is, the controller 10 stops the supply of the electrolytic current from the power source 4 after a predetermined time has elapsed since the drive of the first circulation mechanism 6 is suppressed. The generation of the oxygen gas can be continued in a state where the discharge of the oxygen gas from the anode chamber 14 is suppressed by suppressing the circulation of water to the anode chamber 14 prior to the stop of the supply of the electrolytic current. Therefore, the amount of oxygen present in the anode chamber 14 can be increased. As a result, it is possible to maintain a state in which the positive charge amount on the anode side is larger than the negative charge amount on the cathode side, and to suppress the potential fluctuation in the anode electrode 12 which is easily deteriorated.

The "suppressing the circulation" means that the circulation amount is reduced to preferably 1/100 or less, more preferably 1/1,000 or less of the flow amount during the rated electrolysis, and further preferably 0, that is, the circulation is completely stopped. In addition, the "predetermined time" can be set in advance based on an experiment or simulation by a designer. For example, the predetermined time is a time required until the inside of the anode chamber 14 is filled with the oxygen gas.

The organic hydride generation system 1 may include a mechanism other than the first circulation mechanism 6 as a discharge mechanism for discharging oxygen in the anode chamber 14. For example, the organic hydride generation system 1 may include, as the discharge mechanism, a gas circulation mechanism 48 that circulates an inert gas such as nitrogen or a reducing gas in the anode chamber 14. When the deterioration rate $d_{CA}$ of the cathode electrode 16 is higher than the deterioration rate $d_{AN}$ of the anode electrode 12, an inert gas or the like is circulated in the anode chamber 14 by the gas circulation mechanism 48, so that oxygen in the anode chamber 14 can be discharged to reduce the amount of remaining oxygen in the anode chamber 14. The reducing gas is a substance having a reducing action on the anode catalyst, and is, for example, hydrogen.

For example, the gas circulation mechanism 48 includes a tank 50 for an inert gas or a reducing gas, a gas circulation path 52 connecting the anode chamber 14 and the tank 50, and an on-off valve 54 provided in the middle of the gas circulation path 52, and the on-off valve 54 is controlled by the controller 10. The controller 10 can switch between circulation and stopping of the inert gas or the like from the tank 50 to the anode chamber 14 by controlling the on-off valve 54.

The present inventors verified the effects obtained by the specific method 1 and the specific method 2 described above on the basis of the following Example 1 and Comparative Example 1.

Example 1

First, an electrolytic bath including an anode electrode (geometric area: 100 cm$^2$) made of iridium oxide (IrO$_2$), an anode chamber (volume: 40 mL), a cathode electrode (geometric area: 100 cm$^2$) made of platinum ruthenium supported carbon (Pt Ru/C), a cathode chamber (volume: 10 mL), and a reference electrode (standard hydrogen electrode) inserted into the cathode chamber was prepared. Then, using this electrolytic bath, an electrolysis test was performed at a current density of 0.2 A/cm$^2$. During the electrolysis, the entire electrolytic bath was kept at 60° C., a 1M aqueous sulfuric acid solution was circulated in the anode chamber at a flow rate of 20 ccm, and toluene was circulated in the cathode chamber at a flow rate of 20 ccm. At this time, the anode potential was 1.6V vs. RHE, the cathode potential was 0V vs. RHE, and the voltage (cell voltage) of the electrolytic bath was 1.6V.

Figure 2:
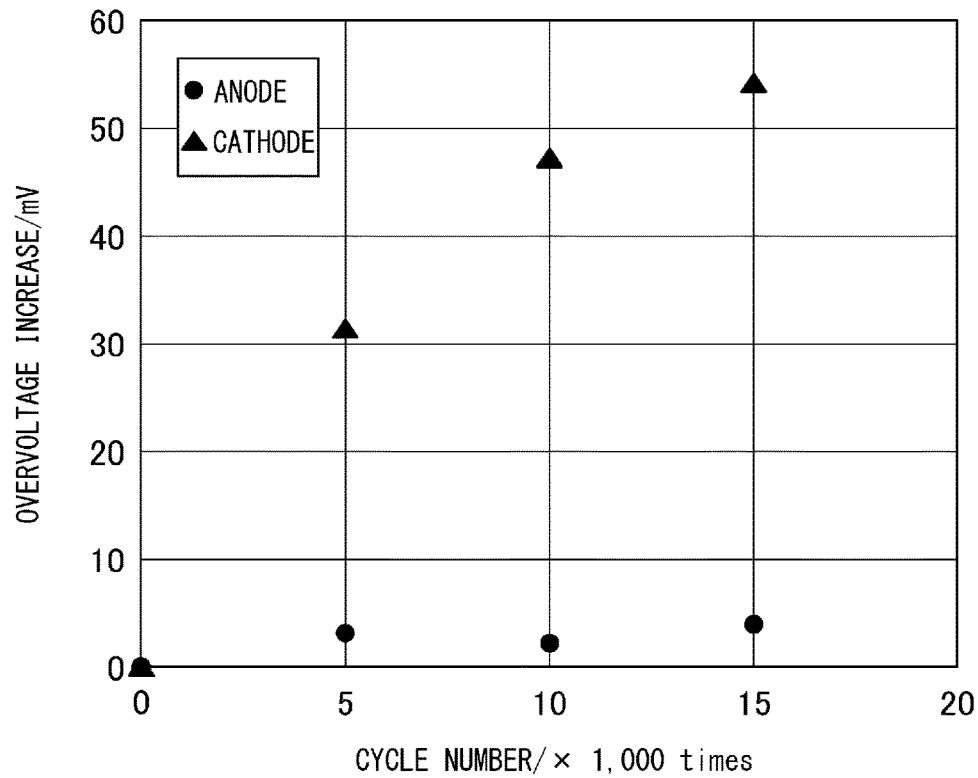
FIG. 2 is a diagram showing a potential change in each electrode by a potential cycle test.

Next, the above-described potential cycle test was performed as a deterioration acceleration test on the anode electrode of the electrolytic bath. Specifically, using an electrochemical evaluation apparatus (potentiostat device: HZ-7000 manufactured by HOKUTO DENKO CORPORATION), a potential cycle test of 5,000 cycles, 10,000 cycles, and 15,000 cycles was performed with the potential range set to 0 to 1.6V vs. RHE based on the reference electrode and the sweep rate set to 1 V/sec. During the test, the entire electrolytic bath was kept at 40° C., a 1M aqueous sulfuric acid solution was circulated in the anode chamber at a flow rate of 20 ccm, and toluene was circulated in the cathode chamber at a flow rate of 20 ccm. After performing the potential cycle test, the electrolytic test was performed again at a current density of 0.2 A/cm$^2$, and the amount of increase in overvoltage was measured using a data recording device (LR8400 manufactured by HIOKI E.E. CORPORATION). The results are shown in FIG. 2. FIG. 2 is a diagram illustrating a potential change in each electrode by a potential cycle test. As shown in FIG. 2, as a result of the potential cycle test on the anode electrode (anode), the voltage of the electrolytic bath increased by 3 mV at 5,000 cycles, by 2 mV at 10,000 cycles, and by 4 mV at 15,000 cycles.

In addition, the above-described potential cycle test was performed as a deterioration acceleration test on the cathode electrode of the electrolytic bath. Specifically, using an electrochemical evaluation apparatus (HZ-7000 manufactured by HOKUTO DENKO CORPORATION), a potential cycle test of 5,000 cycles, 10,000 cycles, and 15,000 cycles was performed with the potential range set to 0 to 1.6V vs. RHE based on the reference electrode and the sweep rate set to 1 V/sec. During the test, the entire electrolytic bath was kept at 40° C., a 1M aqueous sulfuric acid solution was circulated in the anode chamber at a flow rate of 20 ccm, and toluene was circulated in the cathode chamber at a flow rate of 20 ccm. After performing the potential cycle test, the electrolytic test was performed again at a current density of 0.2 A/cm$^2$, and the amount of increase in overvoltage was measured using a data recording device (LR8400 manufactured by HIOKI E.E. CORPORATION). The results are shown in FIG. 2. As shown in FIG. 2, as a result of the potential cycle test on the cathode electrode (cathode), the voltage of the electrolytic bath increased by 31 mV at 5,000 cycles, by 47 mV at 10,000 cycles, and by 54 mV at 15,000 cycles.

In addition, the electrode capacity of each electrode used in the electrolytic bath was measured using an electrochemical evaluation apparatus (HZ-7000 manufactured by HOKUTO DENKO CORPORATION). Specifically, a three-electrode electrolytic bath was prepared in which the working electrode was an anode electrode or a cathode electrode, the reference electrode was an Ag/AgCl electrode, and the counter electrode was a platinum wire. In addition, a 1M aqueous sulfuric acid solution (normal temperature) degassed with nitrogen was prepared as an electrolyte. Then, for the anode electrode, rated electrolysis was performed at a current density of 0.2 A/cm$^2$ for 5 minutes to generate oxygen. Thereafter, the anode electrode was reduced at a current density of −0.5 mA/cm$^2$, and the relationship between the electricity amount and the potential was measured. For the cathode electrode, rated electrolysis was performed at a current density of −0.2 A/cm$^2$ for 5 minutes to generate hydrogen. Thereafter, the cathode electrode was oxidized at a current density of 0.5 mA/cm$^2$, and the relationship between the electricity amount and the potential was measured. The results are shown in FIG. 3.

Figure 3:
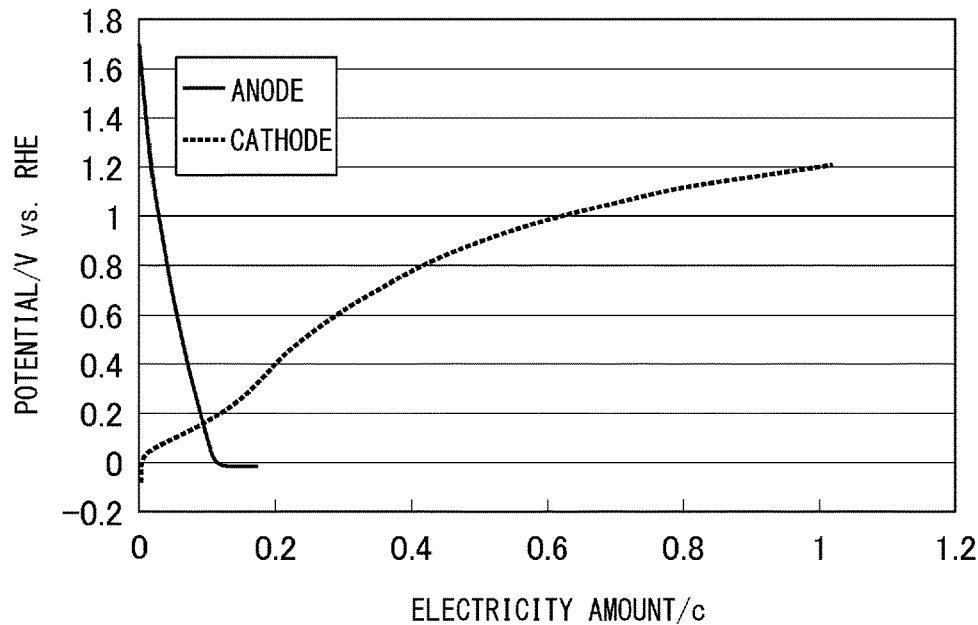
FIG. 3 is a diagram showing a relationship between an electricity amount and a potential in each electrode.

FIG. 3 is a diagram illustrating a relationship between an electricity amount and a potential in each electrode. FIG. 3 shows an electrode potential at each reduction electricity amount when the anode electrode (anode) is reduced by reverse current or cross leakage, and an electrode potential at each oxidation electricity amount when the cathode electrode (cathode) is oxidized. As shown in FIG. 3, the electricity amount when the potential in the anode electrode reached the potential (potential of dissolved hydrogen: 0V vs. RHE) immediately after the electrolysis of the cathode electrode was stopped was 0.11 C. The electricity amount when the potential in the cathode electrode reached the potential (potential of dissolved oxygen: 1.2V vs. RHE) immediately after the electrolysis of the anode electrode was stopped was 1.00. That is, it was confirmed that the electrode capacitance of the anode electrode was 0.11 C and the electrode capacitance of the cathode electrode was 1.00.

From the results of the above-described potential cycle test, it was confirmed that the deterioration rate $d_{CA}$ of the cathode electrode was higher than the deterioration rate $d_{AN}$ of the anode electrode. Therefore, in this electrolytic bath, it is necessary to control the potential in the cathode electrode so as not to fluctuate during the electrolysis stop.

Therefore, rated electrolysis and electrolysis stop control were performed by the following procedure using this electrolytic bath. First, rated electrolysis was performed for 15 minutes under the conditions of a current density of 0.2 A/cm$^2$, an electrolytic bath temperature of 60° C., circulation of a 1M aqueous sulfuric acid solution to an anode chamber at a flow rate of 20 ccm, and circulation of toluene to a cathode chamber at a flow rate of 20 ccm. The voltage of the electrolytic bath at this time was 1.6V. Subsequently, as electrolysis stop control, the circulation of toluene to the cathode chamber was first stopped, supply of an electrolytic current from a power source was stopped 50 minutes after the stoppage, and the circulation of an aqueous sulfuric acid solution to the anode chamber was stopped 2 minutes after the stoppage. When this stepwise stop control was completed, the cathode chamber was filled with hydrogen gas and the anode chamber was filled with aqueous sulfuric acid solution.

Figure 4:
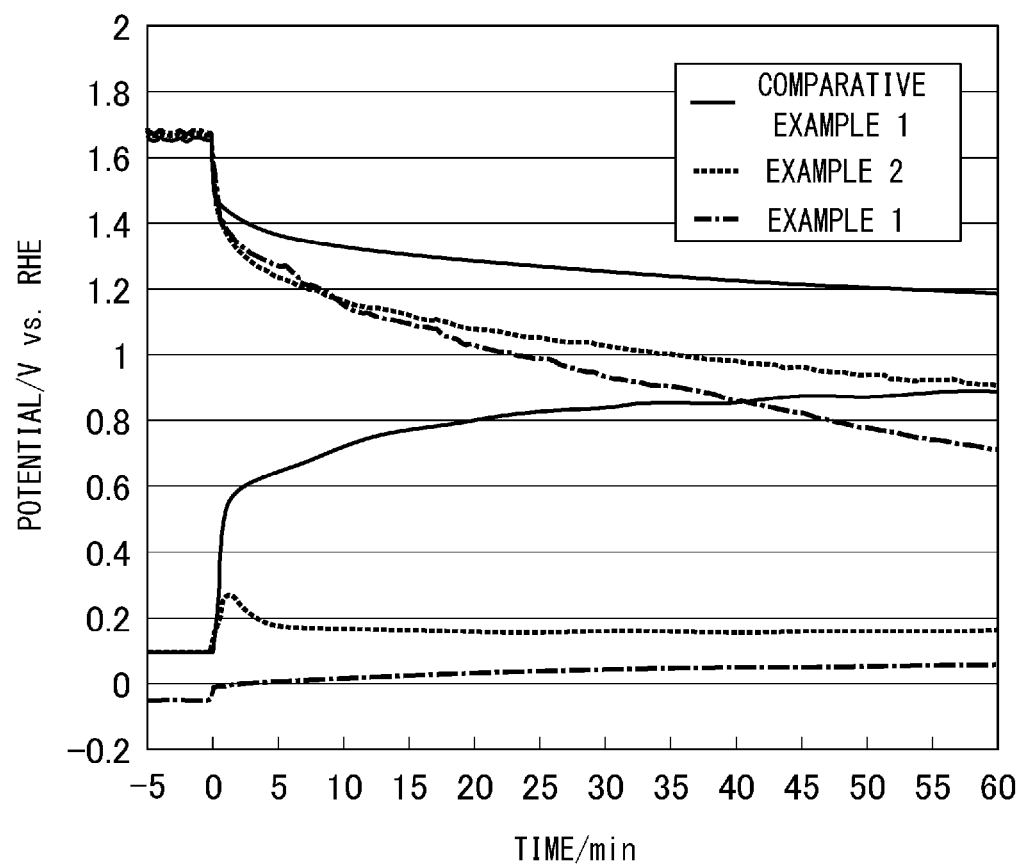
FIG. 4 is a diagram showing a potential change in each electrode when control according to Example 1, Comparative Example 1, and Example 2 is performed.

In addition, the potentials in the anode electrode and the cathode electrode when the stepwise stop control was performed were measured using a data recording device (LR8400 manufactured by HIOKI E.E. CORPORATION). The results are shown in FIG. 4. FIG. 4 also shows results of Comparative Example 1 and Example 2 described later for comparison. FIG. 4 is a diagram showing a potential change in each electrode when the control according to Example 1, Comparative Example 1, and Example 2 is performed. As shown in FIG. 4, the potential in the anode electrode (anode) gradually decreased from the electrolysis stop (0 minute), while the potential in the cathode electrode hardly changed. When rated electrolysis was performed again after 8 hours elapses from the stop of the rated electrolysis, the voltage (cell voltage) of the electrolytic bath was 1.6001V, and the increase amount of the voltage was 0.1 mV.

Comparative Example 1

Using the same electrolytic bath as used in Example 1, rated electrolysis was performed under the same conditions as in Example 1, and electrolysis stop control was performed according to the following procedure. That is, at the same time as the supply of the electrolytic current was stopped, the circulation of an aqueous sulfuric acid solution to the anode chamber and the circulation of hydrogenation target substance to the cathode chamber were stopped. This stop order corresponds to the stop order in the conventional electrolytic bath.

Similarly to Example 1, the potentials in both electrodes when the electrolysis stop control was performed were measured. The results are shown in FIG. 4. As shown in FIG. 4, the potential in the cathode electrode (cathode) gradually increased after the electrolysis was stopped (0 minute), while the change in the potential in the anode electrode was small. When rated electrolysis was performed again after 8 hours elapses from the stop of the rated electrolysis, the voltage of the electrolytic bath was 1.601V, and the increase amount of the voltage was 1 mV.

From the above results, it was confirmed that the potential fluctuation in the cathode electrode having a high deterioration rate can be suppressed by stepwise control in which the electrolysis is stopped after a predetermined time has elapsed since the circulation of hydrogenation target substance to the cathode chamber is stopped, and stepwise control in which the circulation of water to the anode chamber is stopped after a predetermined time has elapsed since the electrolysis is stopped, whereby an increase in the voltage of the electrolytic bath can be suppressed. From this result, it can be understood that when the deterioration rate of the anode electrode is higher than the deterioration rate of the cathode electrode, the potential fluctuation in the anode electrode having a high deterioration rate can be suppressed by stepwise control in which the electrolysis is stopped after a predetermined time has elapsed since the circulation of water to the anode chamber is stopped, and stepwise control in which the circulation of a hydrogenation target substance to the cathode chamber is stopped after a predetermined time has elapsed since the electrolysis is stopped.

Specific Method 3 for Controlling Potential Change During Operation Stop

The control method of the present embodiment includes, when the deterioration rate $d_{CA}$ of the cathode electrode 16 is higher than the deterioration rate $d_{AN}$ of the anode electrode 12, supplying hydrogen to the cathode chamber 18 during the operation stop of the organic hydride generation system 1. As a result, it is possible to maintain a state in which the negative charge amount on the cathode side is larger than the positive charge amount on the anode side, and to suppress the potential fluctuation in the cathode electrode 16 which is easily deteriorated.

Further, the control method of the present embodiment includes, when the deterioration rate $d_{AN}$ of the anode electrode 12 is higher than the deterioration rate $d_{CA}$ of the cathode electrode 16, supplying oxygen to the anode chamber 14 during the operation stop of the organic hydride generation system 1. As a result, it is possible to maintain a state in which the positive charge amount on the anode side is larger than the negative charge amount on the cathode side, and to suppress the potential fluctuation in the anode electrode 12 which is easily deteriorated.

As a mechanism for supplying hydrogen to the cathode chamber 18, the above-described gas circulation mechanism 40 is exemplified. In this case, a hydrogen gas is stored in the tank 42 instead of the inert gas or the oxidizing gas. The controller 10 can switch between circulation and stopping of the hydrogen gas from the tank 42 to the cathode chamber 18 by controlling the on-off valve 46. As a mechanism for supplying oxygen to the anode chamber 14, the above-described gas circulation mechanism 48 is exemplified. In this case, an oxygen gas is stored in the tank 50 instead of the inert gas and the reducing gas. The controller 10 can switch between circulation and stopping of the oxygen gas from the tank 50 to the anode chamber 14 by controlling the on-off valve 54.

In addition, the mechanism for supplying hydrogen to the cathode chamber 18 may be a mechanism in which hydrogen is dissolved in the catholyte to be circulated in the cathode chamber 18 and the catholyte is circulated in the cathode chamber 18 by the second circulation mechanism 8. Similarly, the mechanism for supplying oxygen to the anode chamber 14 may be a mechanism in which oxygen is dissolved in water to be circulated in the anode chamber 14 and the water is circulated in the anode chamber 14 by the first circulation mechanism 6. The supply of hydrogen to the cathode chamber 18 and the supply of oxygen to the anode chamber 14 may be continued from the stop to the restart of the operation of the organic hydride generation system 1, or may be stopped after the lapse of a predetermined time.

The present inventors verified the effects obtained by the specific method 3 described above on the basis of the following Example 2.

Example 2

Using the same electrolytic bath as used in Example 1, rated electrolysis and electrolysis stop control were performed by the following procedure. First, rated electrolysis was performed at a current density of 0.2 A/cm$^2$ and an electrolytic bath temperature of 60° C. for 15 minutes. During the electrolysis, a 1M aqueous sulfuric acid solution was circulated in the anode chamber at a flow rate of 20 ccm. In the cathode chamber, toluene in which hydrogen was previously dissolved until saturated was circulated at a flow rate of 20 ccm. Subsequently, as the electrolysis stop control, the circulation of an aqueous sulfuric acid solution to the anode chamber was stopped 2 minutes after the rated electrolysis was stopped. The circulation of toluene to the cathode chamber was continued.

The potentials in the anode electrode and the cathode electrode when the above-described electrolysis stop control was performed were measured using a data recording device (LR8400 manufactured by HIOKI E.E. CORPORATION). The results are shown in FIG. 4. As shown in FIG. 4, the potential in the anode electrode (anode) gradually decreased from the electrolysis stop (0 minute), while the potential in the cathode electrode hardly changed. When rated electrolysis was performed again after 8 hours elapses from the stop of the rated electrolysis, the voltage (cell voltage) of the electrolytic bath was 1.6001V, and the increase amount of the voltage was 0.1 mV.

Specific Method 4 for Controlling Potential Change During Operation Stop

The control method of the present embodiment includes, when the deterioration rate $d_{CA}$ of the cathode electrode 16 is higher than the deterioration rate $d_{AN}$ of the anode electrode 12, starting circulation of a hydrogenation target substance to the cathode chamber 18 after the supply of the electrolytic current is started at the time of shifting from the operation stop to the operation start of the organic hydride generation system 1.

That is, the controller 10 starts drive of the second circulation mechanism 8 simultaneously with or after the start of supply of the electrolytic current from the power source 4. By stopping the second circulation mechanism 8 until the supply of the electrolytic current is started, it is possible to suppress a decrease in the amount of hydrogen present in the cathode chamber 18 during the stop of the electrolysis. As a result, it is possible to maintain a state in which the negative charge amount on the cathode side is larger than the positive charge amount on the anode side until the operation of the organic hydride generation system 1 is started, and to suppress the potential fluctuation in the cathode electrode 16 which is easily deteriorated.

Further, the control method of the present embodiment includes, when the deterioration rate $d_{AN}$ of the anode electrode 12 is higher than the deterioration rate $d_{CA}$ of the cathode electrode 16, starting circulation of water to the anode chamber 14 after the supply of the electrolytic current is started at the time of shifting from the operation stop to the operation start of the organic hydride generation system 1.

That is, when the anode electrode 12 is more easily deteriorated than the cathode electrode 16, the controller 10 starts drive of the first circulation mechanism 6 simultaneously with or after the start of supply of the electrolytic current from power source 4. By stopping the first circulation mechanism 6 until the supply of the electrolytic current is started, it is possible to suppress a decrease in the amount of oxygen present in the anode chamber 14 during the stop of the electrolysis. As a result, it is possible to maintain a state in which the positive charge amount on the anode side is larger than the negative charge amount on the cathode side until the operation of the organic hydride generation system 1 is started, and to suppress the potential fluctuation in the anode electrode 12 which is easily deteriorated. The "starting circulation" means that the flow amount is increased from the flow amount in a state where the circulation is suppressed to a flow amount exceeding the flow amount.

Other Specific Methods for Controlling Potential Change During Operation Stop

When the cathode electrode 16 is more easily deteriorated than the anode electrode 12, the volume of the cathode chamber 18 may be made larger than the volume of the anode chamber 14. As a result, it is possible to maintain a state in which the negative charge amount on the cathode side is larger than the positive charge amount on the anode side. Similarly, when the anode electrode 12 is more easily deteriorated than the cathode electrode 16, the volume of the anode chamber 14 may be made larger than the volume of the cathode chamber 18. As a result, it is possible to maintain a state in which the positive charge amount on the anode side is sufficiently larger than the negative charge amount on the cathode side.

When the cathode electrode 16 is more easily deteriorated than the anode electrode 12, the inside of the cathode chamber 18 may be pressurized at the time of shifting to the operation stop of the organic hydride generation system 1. As a result, the amount of gaseous hydrogen present in the cathode chamber 18 can be increased, and thus it is possible to maintain a state in which the negative charge amount on the cathode side is larger than the positive charge amount on the anode side. This method can be realized, for example, by the organic hydride generation system 1 including a pressurization mechanism for the cathode chamber 18 and the controller 10 controlling the pressurization mechanism.

Similarly, when the anode electrode 12 is more easily deteriorated than the cathode electrode 16, the anode chamber 14 may be pressurized at the time of shifting to the operation stop of the organic hydride generation system 1. As a result, the amount of gaseous oxygen present in the anode chamber 14 can be increased, and thus it is possible to maintain a state in which the positive charge amount on the anode side is larger than the negative charge amount on the cathode side. This method can be realized, for example, by the organic hydride generation system 1 including a pressurization mechanism for the anode chamber 14 and the controller 10 controlling the pressurization mechanism.

In addition, when the cathode electrode 16 is more easily deteriorated than the anode electrode 12, the cathode electrode 16 may contain a material that increases the electrode capacity, such as carbon. As a result, it is possible to maintain a state in which the negative charge amount on the cathode side is larger than the positive charge amount on the anode side. Similarly, when the anode electrode 12 is more easily deteriorated than the cathode electrode 16, the anode electrode 12 may contain a material that increases the electrode capacity, such as carbon. As a result, it is possible to maintain a state in which the positive charge amount on the anode side is larger than the negative charge amount on the cathode side. The above-described specific methods can be appropriately combined.

As described above, the method for controlling the organic hydride generation system 1 according to the present embodiment includes controlling the potentials in the anode electrode 12 and the cathode electrode 16 such that the potential change in the electrode having a higher deterioration rate due to the potential change generated during the operation stop is smaller than the potential change in the electrode having a lower deterioration rate among the anode electrode 12 and the cathode electrode 16 included in the electrolytic bath 2. As described above, by suppressing the potential change in the electrode having poor deterioration resistance, the durability of the organic hydride generation system 1 can be improved, and the organic hydride can be manufactured with low power for a longer period of time.

The deterioration rate $d_{AN}$ of the anode electrode 12 is a value obtained by dividing, by the number of cycles, the amount of change in voltage during the rated electrolysis before and after a potential cycle test when the potential cycle test in which the potential in the anode electrode 12 during the rated electrolysis of the organic hydride generation system 1 and the potential obtained by subtracting an overvoltage from the potential in the cathode electrode 16 during the rated electrolysis are repeatedly applied to the anode electrode 12 is performed. Further, the deterioration rate $d_{CA}$ of the cathode electrode 16 is a value obtained by dividing, by the number of cycles, the amount of change in voltage during the rated electrolysis before and after a potential cycle test when the potential cycle test in which the potential in the cathode electrode 16 during the rated electrolysis of the organic hydride generation system 1 and the potential obtained by subtracting an overvoltage from the potential in the anode electrode 12 during the rated electrolysis are repeatedly applied to the cathode electrode 16 is performed. Accordingly, the durability of the organic hydride generation system 1 can be improved.

In addition, the control method of the present embodiment includes maintaining the state of $Q_{AN}\_electrode+Q_{AN}\_O_2 < Q_{CA}\_electrode+Q_{CA}\_H_2$ when the deterioration rate $d_{CA}$ is higher than the deterioration rate $d_{AN}$ or maintaining the state of $Q_{AN}\_electrode+Q_{AN}\_O_2 > Q_{CA}\_electrode+Q_{CA}\_H_2$ when the deterioration rate $d_{AN}$ is higher than the deterioration rate $d_{CA}$, where $Q_{AN}\_electrode$ represents the charge amount of the anode electrode 12, $Q_{CA}\_electrode$ represents the charge amount of the cathode electrode 16, $Q_{AN}\_O_2$ represents the absolute value of the positive charge amount of oxygen present in the anode chamber 14, and $Q_{CA}\_H_2$ represents the absolute value of the negative charge amount of hydrogen present in the cathode chamber 18. Accordingly, the durability of the organic hydride generation system 1 can be improved.

Further, the control method of the present embodiment includes, when the deterioration rate $d_{CA}$ is higher than the deterioration rate $d_{AN}$, stopping the supply of the electrolytic current after a predetermined time has elapsed since the circulation of the hydrogenation target substance to the cathode chamber 18 is suppressed at the time of shifting to the operation stop, or when the deterioration rate $d_{AN}$ is higher than the deterioration rate $d_{CA}$, suppressing the circulation of the hydrogenation target substance to the cathode chamber 18 after a predetermined time has elapsed since the supply of the electrolytic current is stopped at the time of shifting to the operation stop. Accordingly, the durability of the organic hydride generation system 1 can be improved.

Further, the control method of the present embodiment includes suppressing the circulation of water to the anode chamber 14 after a predetermined time has elapsed since the supply of the electrolytic current is stopped at the time of shifting to the operation stop when the deterioration rate $d_{CA}$ is higher than the deterioration rate $d_{AN}$, or stopping the supply of the electrolytic current after a predetermined time has elapsed since the circulation of water to the anode chamber 14 is suppressed at the time of shifting to the operation stop when the deterioration rate $d_{AN}$ is higher than the deterioration rate $d_{CA}$. Accordingly, the durability of the organic hydride generation system 1 can be improved.

Further, the control method of the present embodiment includes circulating an inert gas or a reducing gas in the anode chamber 14 during the operation stop when the deterioration rate $d_{CA}$ is higher than the deterioration rate $d_{AN}$, or circulating an inert gas or an oxidizing gas in the cathode chamber 18 during the operation stop when the deterioration rate $d_{AN}$ is higher than the deterioration rate $d_{CA}$. Accordingly, the durability of the organic hydride generation system 1 can be improved.

Further, the control method of the present embodiment includes supplying hydrogen to the cathode chamber 18 during the operation stop when the deterioration rate $d_{CA}$ is higher than the deterioration rate $d_{AN}$, or supplying oxygen to the anode chamber 14 during the operation stop when the deterioration rate $d_{AN}$ is higher than the deterioration rate $d_{CA}$. Accordingly, the durability of the organic hydride generation system 1 can be improved.

Further, the control method of the present embodiment includes starting the circulation of the hydrogenation target substance to the cathode chamber 18 after supply of the electrolytic current is started at the time of starting the operation from the operation stop when the deterioration rate $d_{CA}$ is higher than the deterioration rate $d_{AN}$, or starting the circulation of water to the anode chamber 14 after supply of the electrolytic current is started at the time of starting the operation from the operation stop when the deterioration rate $d_{AN}$ is higher than the deterioration rate $d_{CA}$.

The embodiment of the present invention has been described in detail above. The above-described embodiment merely shows a specific example in carrying out the present invention. The content of the embodiment does not limit the technical scope of the present invention, and many design changes such as change, addition, and deletion of components can be made without departing from the ideas of the invention defined in the claims. A new embodiment with the design change has the effects of the combined embodiment and the modification. In the above-described embodiment, the contents that can be changed in design are emphasized by adding notations such as "of the present embodiment" or "in the present embodiment", but design changes are allowed even in contents without such notations. Any combination of the above components is also effective as an aspect of the present invention.

The embodiment may be identified by the item described below.

Item 1

An organic hydride generation system 1 including:
an electrolytic bath 2 including an anode electrode 12 for oxidizing water to generate protons, a cathode electrode 16 for hydrogenating a hydrogenation target substance with protons to generate an organic hydride, an anode chamber 14 accommodating the anode electrode 12, a cathode chamber 18 accommodating the cathode electrode 16, and a diaphragm 20 having proton conductivity and partitioning the anode chamber 14 and the cathode chamber 18;

a power source 4 structured to supply an electrolytic current to the electrolytic bath 2; and a controller 10 structured to control potentials in the anode electrode 12 and the cathode electrode 16, wherein the anode electrode 12 has a deterioration characteristic of being deteriorated at a predetermined deterioration rate $d_{AN}$ by a potential change generated during an operation stop in which the electrolytic current is not supplied to the electrolytic bath 2, the cathode electrode 16 has a deterioration characteristic of being deteriorated at a predetermined deterioration rate $d_{CA}$ by a potential change generated during the operation stop, and the controller 10 controls the potentials in the anode electrode 12 and the cathode electrode 16 such that the potential change in an electrode having a higher deterioration rate among the anode electrode 12 and the cathode electrode 16 is smaller than the potential change in an electrode having a lower deterioration rate.

The invention claimed is:

1. A method for controlling an organic hydride generation system including an electrolytic bath for generating an organic hydride and a power source for supplying an electrolytic current to the electrolytic bath, the electrolytic bath including an anode electrode for oxidizing water to generate protons, a cathode electrode for hydrogenating a hydrogenation target substance with the protons to generate an organic hydride, an anode chamber accommodating the anode electrode, a cathode chamber accommodating the cathode electrode, and a diaphragm partitioning the anode chamber and the cathode chamber, the anode electrode having a deterioration characteristic of being deteriorated at a predetermined deterioration rate daN by a potential change generated during an operation stop in which the electrolytic current is not supplied to the electrolytic bath, the cathode electrode having a deterioration characteristic of being deteriorated at a predetermined deterioration rate dca by a potential change generated during the operation stop, the control method comprising controlling the potentials in the anode electrode and the cathode electrode such that the potential change in an electrode having a higher deterioration rate among the anode electrode and the cathode electrode is smaller than the potential change in an electrode having a lower deterioration rate.

2. The method for controlling an organic hydride generation system according to claim 1, wherein
the deterioration rate dan is a value obtained by dividing, by a number of cycles, an amount of change in voltage during the rated electrolysis before and after a potential cycle test when the potential cycle test in which a potential in the anode electrode during the rated electrolysis of the organic hydride generation system and a potential obtained by subtracting an overvoltage from a potential in the cathode electrode during the rated electrolysis are repeatedly applied to the anode electrode is performed, and the deterioration rate dca is a value obtained by dividing, by a number of cycles, an amount of change in voltage during the rated electrolysis before and after a potential cycle test when the potential cycle test in which the potential in the cathode electrode during the rated electrolysis and a potential obtained by subtracting an overvoltage from the potential in the anode electrode during the rated electrolysis are repeatedly applied to the cathode electrode is performed.

3. The method for controlling an organic hydride generation system according to claim 1, comprising maintaining a state of $Q_{AN}\_electrode+Q_{AN}\_O_2 < Q_{CA}\_electrode+Q_{CA}\_H_2$ when the deterioration rate $d_{CA}$ is higher than the deterioration rate $d_{AN}$ or maintaining a state of $Q_{AN}\_electrode+Q_{AN}\_O_2 > Q_{CA}\_electrode+Q_{CA}\_H_2$ when the deterioration rate $d_{AN}$ is higher than the deterioration rate $d_{CA}$, where $Q_{AN}\_electrode$ represents a charge amount of the anode electrode, $Q_{CA}\_electrode$ represents a charge amount of the cathode electrode, $Q_{AN}\_O_2$ represents an absolute value of a positive charge amount of oxygen present in the anode chamber, and $Q_{CA}\_H_2$ represents an absolute value of a negative charge amount of hydrogen present in the cathode chamber.

4. The method for controlling an organic hydride generation system according to claim 1, wherein
in the organic hydride generation system, the hydrogenation target substance is circulated in the cathode chamber during operation, and
the control method further comprises, when the deterioration rate $d_{CA}$ is higher than the deterioration rate $d_{AN}$, stopping supply of the electrolytic current after a predetermined time has elapsed since the circulation is suppressed at the time of shifting to the operation stop, or, when the deterioration rate $d_{AN}$ is higher than the deterioration rate $d_{CA}$, suppressing the circulation after a predetermined time has elapsed since the supply of the electrolytic current is stopped at the time of shifting to the operation stop.

5. The method for controlling an organic hydride generation system according to claim 1, wherein
in the organic hydride generation system, water is circulated in the anode chamber during operation, and
the control method further comprises, when the deterioration rate $d_{CA}$ is higher than the deterioration rate $d_{AN}$, suppressing the circulation after a predetermined time has elapsed since supply of the electrolytic current is stopped at the time of shifting to the operation stop, or, when the deterioration rate $d_{AN}$ is higher than the deterioration rate $d_{CA}$, stopping supply of the electrolytic current after a predetermined time has elapsed since the circulation is suppressed at the time of shifting to the operation stop.

6. The method for controlling an organic hydride generation system according to claim 1, further comprising circulating an inert gas or a reducing gas in the anode chamber during the operation stop when the deterioration rate $d_{CA}$ is higher than the deterioration rate $d_{AN}$, or circulating an inert gas or an oxidizing gas in the cathode chamber during the operation stop when the deterioration rate $d_{AN}$ is higher than the deterioration rate $d_{CA}$.

7. The method for controlling an organic hydride generation system according to claim 1, further comprising supplying hydrogen to the cathode chamber during the operation stop when the deterioration rate $d_{CA}$ is higher than the deterioration rate $d_{AN}$, or supplying oxygen to the anode chamber during the operation stop when the deterioration rate $d_{AN}$ is higher than the deterioration rate $d_{CA}$.

8. The method for controlling an organic hydride generation system according to claim 1, wherein
in the organic hydride generation system, the hydrogenation target substance is circulated in the cathode chamber and water is circulated in the anode chamber during operation, and
the control method further comprises, when the deterioration rate $d_{CA}$ is higher than the deterioration rate $d_{AN}$, starting the circulation of the hydrogenation target substance to the cathode chamber after supply of the electrolytic current is started at the time of starting the operation from the operation stop, or, when the deterioration rate $d_{AN}$ is larger than the deterioration rate $d_{CA}$, starting the circulation of water to the anode chamber after supply of the electrolytic current is started at the time of starting the operation from the operation stop.

9. An organic hydride generation system comprising:
an electrolytic bath including an anode electrode for oxidizing water to generate protons, a cathode electrode for hydrogenating a hydrogenation target substance with protons to generate an organic hydride, an anode chamber accommodating the anode electrode, a cathode chamber accommodating the cathode electrode, and a diaphragm partitioning the anode chamber and the cathode chamber;
a power source structured to supply an electrolytic current to the electrolytic bath; and
a controller structured to control potentials in the anode electrode and the cathode electrode, wherein
the anode electrode has a deterioration characteristic of being deteriorated at a predetermined deterioration rate $d_{AN}$ by a potential change generated during an operation stop in which the electrolytic current is not supplied to the electrolytic bath,
the cathode electrode has a deterioration characteristic of being deteriorated at a predetermined deterioration rate $d_{CA}$ by a potential change generated during the operation stop, and
the controller controls the potentials in the anode electrode and the cathode electrode such that the potential change in an electrode having a higher deterioration rate among the anode electrode and the cathode electrode is smaller than the potential change in an electrode having a lower deterioration rate.

* * * * *